April 29, 1952 H. M. CONDON Re. 23,482
MEAT PRODUCT AND METHOD OF TREATING MEAT
Original Filed March 27, 1947
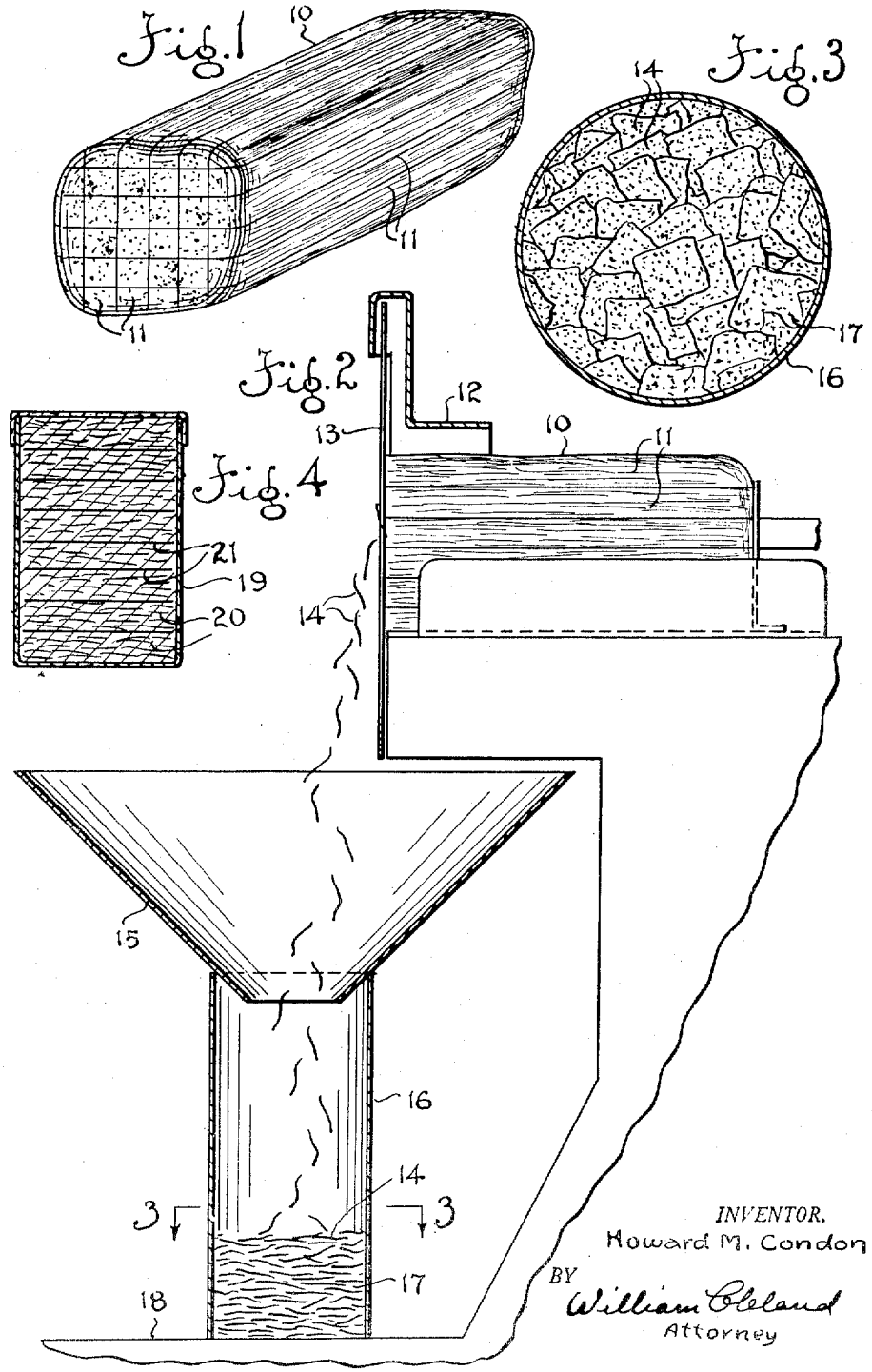

Reissued Apr. 29, 1952

Re. 23,482

UNITED STATES PATENT OFFICE 23,482

MEAT PRODUCT AND METHOD OF TREATING MEAT

Howard M. Condon, Akron, Ohio, assignor to Grand Duchess Steaks, Inc., Akron, Ohio, a corporation of Ohio Original No. 2,527,493, dated October 24, 1950, Serial No. 737,501, March 27, 1947. Application for reissue August 17, 1951, Serial No. 242,337

9 Claims. (Cl. 99—194)

Matter enclosed in heavy brackets [ ] appears in the original patent but forms no part of this reissue specification; matter printed in italics indicates the additions made by reissue.

This invention relates to a meat product and to a method of treating meat.

One object of the invention is to provide an improved meat product, particularly adaptable for sale in quick frozen state, in which substantially all of the original color and flavor of the meat is retained, and which has the additional advantage of being easily digestible regardless of the fibrous structure of the original meat.

Another object of the invention is to provide a meat product of the character described adapted to be conveniently packaged in quick frozen condition and to be cooked in desired cake or patty form in a relatively few minutes.

Another object of the invention is to provide a simple and economical method for preparing the improved meat product described above.

Other objects of the invention will be manifest from the following brief description and the accompanying drawings.

Of the accompanying drawings:

Figure 1 is a perspective view of a chunk or block of meat cut into elongated strips in accordance with one of the method steps of the invention.

Figure 2 is a side elevation, partly broken away and in section, illustrating apparatus for carrying out a meat flaking operation of the invention.

Figure 3 is a cross-section, on an enlarged scale, taken substantially on the line 3—3 of Figure 2.

Figure 4 is a vertical cross-section through a package containing flaked meat produced in accordance with the invention.

Referring particularly to Figure 1, as an illustrative example, the method of the invention may be carried out by first providing a boneless chunk or block 10 of raw or uncooked meat and cutting the same, by use of any suitable cutting means (not shown), into elongated coextending strips 11, 11 of relatively small cross-section, as compared with the cross-section of the chunk. The original chunk 10, of course, might also be composed of several relatively smaller chunks *or segments either naturally constituted therein or otherwise arranged in the same*, or it could be formed by arranging elongated cuts *or pieces* 11, 11 from any source, or from different kinds of meat, such as beef, pork, veal, etc. In any event, the block 10 of elongated strips 11, while maintained in the substantially compact or solid form of Figure 1, as by use of temporary binding means (not shown), may be placed in a known type of rapid freezing unit and frozen hard throughout. The temperature range suitable for this purpose may be from 20° to 40° below 0° F. This freezing of the block 10, by the nature of the meat, will bind the elongated strips 11 together.

Referring now to Fig. 2, the hard frozen block of meat 10 may be placed in a suitable slicing machine 12 having a rotary cutter 13 to cut, in rapid succession, paper thin slices of meat from the end of the block. Although in the frozen condition of the block the strips are cohesively held together by fusion of the natural moisture of meat, when said thin slices are thus removed, such cohesion is insufficient to prevent separation of the corresponding slice portions from the respective strips 11, and each of the thin slices, therefore, in falling away from the cutter 13 separates into a plurality of chip-like, *paper-thin* pieces or flakes 14, 14. The chips or flakes 14 may be allowed, for instance, to fall through a funnel 15 into an open ended, stainless steel cylinder 16, of desired size and cross-section to collect a correspondingly shaped mass 17 of flakes 14 on a surface 18. The mass 17 may be packaged or otherwise maintained in loose form or it may be compressed into compact form in any desired shape or size. As a typical illustration, a compact mass of flakes 14 may be packaged in a suitable closed container 19, either in one solid mass, or in a series of cakes or patties 20 separated as by means of wax paper spacers 21. As best shown in Figures 3 and 4, the flakes of the patties in particular are arranged haphazardly in generally superposed and substantially overlapping relation. In any case, the packaged product may be placed in quick freezing equipment and thereafter retained in frozen condition until ready for use. If the packaged product is retained in one solid piece, as described, parts thereof may be separated or cut from the whole mass and formed into any desired size or shape, as for example, into a cake or patty to be fried, broiled, or otherwise prepared for eating. Should the product be packaged in patty form, as shown in Figure 4, it is only necessary to remove the patties as desired for use. *As illus-*

*trated in Figure 3, the flakes 14 are of approximately one-twentieth of the lateral area of the patties, although it is self-evident that the size of the flakes may vary considerably according to conditions, such as the size of the pieces in block 10, the texture of the meat, and the number of blades on cutter 13 and/or the speed of rotation thereof.*

During the flaking operations, as shown in Figure 2, suet or fat *in suitable form and proportions* may be added, if desired. Flavoring materials are easily added in the same way.

When the strips 11 are arranged in the block 10 with the fibre structure thereof extending longitudinally of the strips, the resulting product *inherently* comprises a multiplicity of flakes 14, 14, of non-fibrous nature, and therefore easily digestible when cooked, regardless of how tough the original meat cuts may have been. It has been found that by the use of the herein described process the original coloring and flavoring of the meat is preserved in the frozen packaged product until read for use. [It is contemplated, however, that the above described flaking process may be similarly carried out with the use of cooked or partially cooked meat as a basis in the block 10 of strips 11.]

*It will be apparent from the foregoing that the flakes of hard frozen raw meat, as cut from the block 10 in Figure 2, immediately begin to thaw upon exposure to atmosphere and that this thawing process goes on as the flakes collect into the patty of Figure 3. Thus, by nature of these paper thin meat flakes they are at least partially softened upon exposure to the atmosphere, so that when the at least partially softened flakes are compressed into a compact mass of patty shape and size for cooking purposes they unite much in the manner of snowflakes in a snowball. By the method described solid meat of tough, fibrous consistency may be virtually taken apart and reintegrated into solid masses of tender, non-fibrous meat of uniform consistency and flavor. It is also self-evident that there is a limit to the size of paper thin flakes which can be separated from a solid block of hard frozen raw meat by a rotating cutter, since such very thin hard frozen flakes break easily.*

Modifications of the invention may be resorted to without departing from the spirit thereof or the scope of the appended claims.

What is claimed is:

1. A method of treating meat, which comprises the steps of providing a block composed of a plurality of non-coherently, longitudinally coextending strips of *raw* meat of relatively small transverse cross-section as compared with the transverse cross-section of the block, freezing the block to substantially hardened state throughout, slicing relative thin slices from the hardened block in planes transversely of said strips, the removed slices thereby separating into relatively small flakes from said coextending strips, and forming the flakes into a compact integrated mass thereof of desired size and shape, the average size of said flakes being such as would require a substantial number of the same to cover the broad lateral surface area of a said mass in flattened patty form for cooking purposes.

2. A method of treating meat, which comprises the steps of providing a block of *raw* meat, cutting said block in series of planes to provide a plurality of non-coherently, longitudinally coextending strips maintained in the block, freezing said cut block to hardened state, removing relatively thin slices from the frozen block transversely of said strips, each of the slices thereby separating into a substantial number of relatively small flakes from the respective pieces of the block, and compressing said flakes into a compact integrated mass of desired size and flattened patty shape for cooking purposes, the average size of said flakes being a relatively small fraction of the broad lateral area of the patty-shaped mass.

3. A method of treating meat, which comprises the steps of providing a block composed of non-coherently, longitudinally coextending strips of *raw* meat in hard frozen state throughout, the average transverse cross-section of said strips being a relatively small fraction of the total cross-section of the block transversely thereof, cutting relatively thin slices from the frozen block in planes transversely of said strips, the removed slices thereby separating into relatively small flakes from the respective strips of the block, and compressing a multiplicity of said flakes into a compact integrated mass of desired size and flattened patty shape for cooking purposes, said strips of meat in said block having the fibres thereof extending generally longitudinally thereof, and the resulting flakes thereby being substantially non-fibrous, the average size of said flakes being a relative small fraction of the broad lateral area of the patty-shaped mass.

4. A meat product comprising a compact integrated mass for cooking purposes, said mass being composed of a multiplicity of relatively thin substantially non-fibrous flakes of *raw* meat, said flakes *inherently* in the mass being in generally superposed, substantially overlapping relation.

5. A meat product comprising a compact integrated mass of relatively thin, substantially non-fibrous flakes of *raw* meat, said mass being of a flattened patty shape and size for cooking purposes, said flakes *inherently* in the mass being in generally superposed, substantially overlapping relation.

6. A meat product as set forth in claim 4, said mass being in hard-frozen condition.

7. A meat product as set forth in claim 5, said mass being in hard-frozen condition.

*8. A method of treating meat, which comprises the steps of providing a block composed of a plurality of separate pieces of raw meat of relatively small cross-section compared with the transverse cross-section of the block, freezing the block to substantially hardened state throughout, slicing relatively thin slices from the hardened block in planes transversely through said pieces whereby the removed slices separate into relatively small flakes from said pieces, forming the flakes into a compact integrated mass thereof of desired size and shape, the average size of said flakes being such as would require a substantial number of the same to cover the broad lateral surface area of a said mass in flattened patty form for cooking purposes, and further freezing said mass to substantially hardened state throughout.*

*9. A method of treating meat, which comprises the steps of providing a block of meat in substantially hard frozen state throughout and composed of pieces of raw meat of relatively small transverse cross-section as compared with the transverse cross-section of the block throughout the length thereof, slicing relatively thin slices from the hardened block in planes*

*transversely of the same whereby the removed slices separate into relatively small flakes of meat, at least partially softening the thin flakes, compressing a multiplicity of said at least partially softened flakes into a compact integrated mass, and further freezing said mass to hard-frozen state throughout.*

HOWARD M. CONDON.

REFERENCES CITED

The following references are of record in the file of this or the original patent:

UNITED STATES PATENTS

| Number | Name | Date |
|---|---|---|
| 1,381,526 | Waters | June 14, 1921 |
| 2,052,221 | Dubil | Aug. 25, 1936 |
| 2,224,390 | Holly | Dec. 10, 1940 |
| 2,242,451 | Carpenter | May 20, 1941 |
| 2,255,796 | Linane et al. | Sept. 16, 1941 |
| 2,397,446 | Tansley | Mar. 26, 1946 |